Patented June 27, 1933

1,915,362

UNITED STATES PATENT OFFICE

WILLIAM V. HANKS AND JAMES K. SMALL, OF BATON ROUGE, LOUISIANA, ASSIGNORS TO STANDARD OIL DEVELOPMENT COMPANY, A CORPORATION OF DELAWARE

PROCESS FOR PRODUCING HYDROGEN FROM HYDROCARBON GASES

No Drawing.   Application filed May 15, 1930. Serial No. 452,815.

The present invention relates to an improved process for producing hydrogen from hydrocarbon gases by reaction with steam at high temperatures. The invention will be fully understood from the following description and relates particularly to a method for reactivating the catalyst used in the process.

In the operation of the process, natural gas, refinery gas or the like which may or may not contain unsaturated hydrocarbons, for example in an amount between 2 and 10%, is first purified of the major portion of sulfur containing compounds by scrubbing with any suitable sulfur removing agent, such as caustic soda. The gas is then preheated and flows to a primary conversion zone which may comprise a plurality of reaction tubes mounted in a suitable furnace. The tubes are packed with a suitable catalyst which may consist of nickel or nickel oxide, cobalt or its oxides, with the addition of other metals or oxides such as magnesia or alumina. Steam which has been preheated is passed into the reaction zone and reacts with the gas to produce hydrogen and carbon monoxide. The steam is used in an amount generally 100 or 150 percent in excess of that required to theoretically convert all the incoming carbon to carbon monoxide. The temperature in this stage of the conversion is maintained between about 1200° and 2000° F.

The outflowing mixture from the tubes passes to the secondary conversion zone consisting of a large diameter drum arranged in a zone of lower temperature, preferably of the same furnace as the first conversion stage. The drum is filled with a catalyst, generally iron oxide or the like, and is maintained at a temperature of about 800° to 900° F. The carbon monoxide in the entering mixture is converted to carbon dioxide and additional hydrogen. Steam preferably preheated, may be added to this stage of the process. The material is then cooled and the steam condensed out by passage through a suitable cooler after which the gas consists substantially of carbon dioxide and hydrogen. The carbon dioxide is removed by any convenient means, for example by absorption in water under about 5 to 50 atmospheres pressure, the carbon dioxide being released from the water by release of pressure or by heat. The final gas consists substantially of hydrogen and contains less than 3 to 5 percent of carbon dioxide, carbon monoxide and unconverted gas. The process may be operated under atmospheric pressure, or pressures of about 5 to 50 atmospheres may be employed.

In the production of hydrogen by the described method, it is found that the activity of the catalyst used in the primary conversion zone to promote the reaction of hydrocarbon gas and steam to form hydrogen and carbon monoxide is decreased over long periods of time presumably by deposition of carbon which may be observed on the catalytic surface. This is shown by less complete conversion of hydrocarbon gas to hydrogen and carbon monoxide, so that the methane in the final gas rises to 3 to 5 percent or more. In a previous application, Serial No. 434,036 filed March 7, 1930 by Freyermuth, Small and Hanks, it was shown that the deposited carbon may be removed by passing steam alone through the coked tubes at a temperature between 1400° and 2000° F. for a period of 5 to 24 hours, depending on the amount of carbon deposited on the catalyst. By this means the activity of the catalyst is renewed so that it may again be used effectively in the conversion of hydrocarbons to hydrogen.

We have now found that the catalyst may be more rapidly and more completely restored by the use of oxygen, preferably in mixture with other gases, during the reactivation period. The gas used with the air may consist of such gases as nitrogen or carbon monoxide, or gases which react with the coke, such as steam or carbon dioxide, or mixtures of these gases may be employed. The oxygen may preferably comprise about 2 to 15 percent by volume of the mixture, although other proportions may be used. It is preferable to use a diluent gas with the oxygen in order to prevent the formation of excessively high temperatures, which would tend to injure the catalyst. Gases such as nitrogen and carbon monoxide remove the excess heat formed by the oxidation of the coke by their diluent effect. Steam, carbon dioxide, and the like, on the other hand, remove heat not only by their diluent effect but also because of their reaction with the coke which absorbs heat.

The reactivation is preferably carried out at a temperature between about 1200° and 2000° F. and may be conducted for a period of about 3 to 18 hours, or until the tube is free from coke. In practice it is preferable to reactivate only a few of the tubes of a battery at the same time, so that a continuous production of hydrogen may be assured. The period over which a tube may be operated before it must again be reactivated varies from 2 days to 3 weeks. It will be understood that in certain cases it may be preferable to treat the catalyst with hydrogen after the reactivation in order to restore the catalyst further and return it to maximum activity.

This invention is not to be limited by any theory of the mechanism of the reactions, nor to any specific example which may have been given for the purpose of illustration, but only by the following claims in which we wish to claim all novelty inherent in our invention.

We claim:

1. An improved process for obtaining gas rich in free hydrogen from hydrocarbon gases which comprises continuously passing hydrocarbon gas in admixture with steam over a suitable catalyst containing at least one element of the class of nickel and cobalt while at a temperature between the approximate limits of 1200 and 2000° F. for a prolonged period until there is evidence of loss of catalyst activity, then passing a reactivating mixture of oxygen and diluent gases, free of hydrocarbons, over the catalyst while maintained within the same temperature limits for a period of several hours whereby catalytic activity is regained.

2. Process according to claim 1 in which the diluent gases in the reactivating mixture consist of nitrogen and carbon dioxide.

3. Process according to claim 1 in which the reactivating mixture consists of air and steam containing 5 to 30 percent air.

4. Process according to claim 1 in which the catalyst contains nickel.

5. Process according to claim 1 in which the hydrocarbon gas consists of natural or refinery gas from which the major quantity of sulfur compounds have been removed.

6. Process according to claim 1 in which the hydrocarbon gas contains 2 to 10 percent unsaturated hydrocarbons.

7. An improved process for producing gas mixtures rich in free hydrogen comprising passing mixtures of steam and hydrocarbon gas through a plurality of catalytic reaction zones containing activated nickel catalyst and connected in parallel at a temperature below 2000° F. and sufficiently high for reaction, periodically discontinuing the flow of such mixture through each zone in rotation, passing air and steam through such zones maintained within the same temperature range for several hours for catalyst reactivation, the exit gases from the zones undergoing reactivation being kept separate from those of the remaining zones, then resuming the flow of steam and hydrocarbon gas and adjusting the frequency and duration of such catalyst reactivation periods whereby the gas produced by the zones not undergoing reactivation contains less than 3½ percent hydrocarbon.

8. Process according to claim 1 in which the hydrocarbon gas contains 2 to 10 percent unsaturated hydrocarbons and in which the reactive periods may be from about 3 to 18 hours.

WILLIAM V. HANKS.
JAMES K. SMALL.